June 4, 1935.  F. M. BINS  2,003,732
COUPLING FOR CANVAS TUBING
Filed Jan. 30, 1935
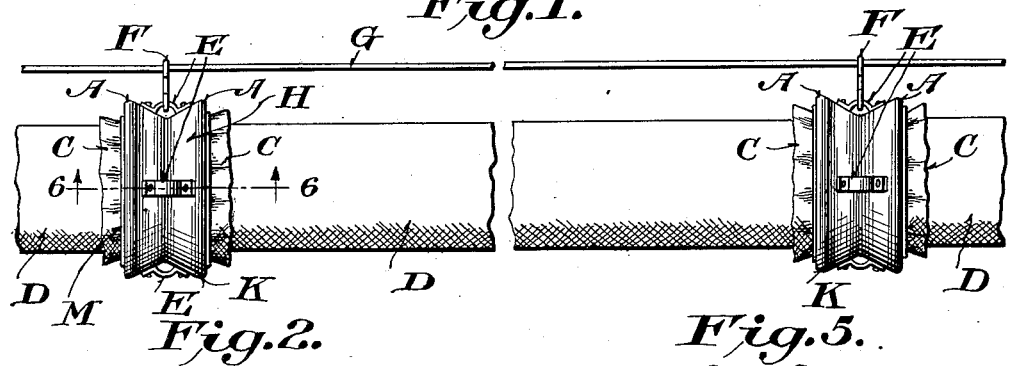
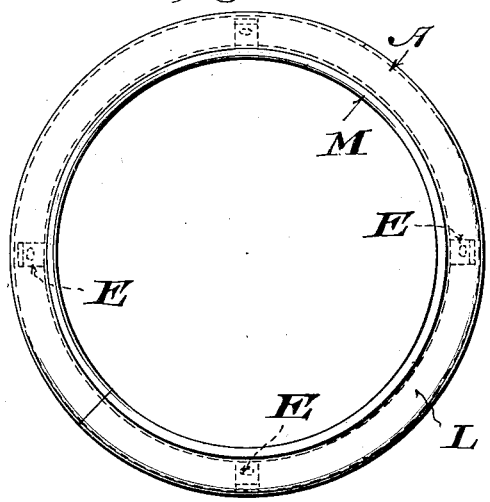
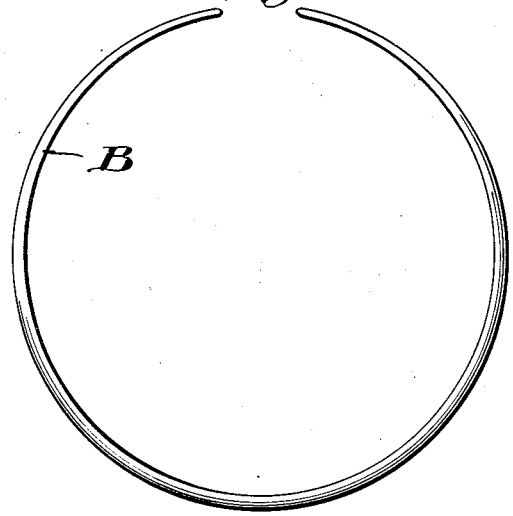
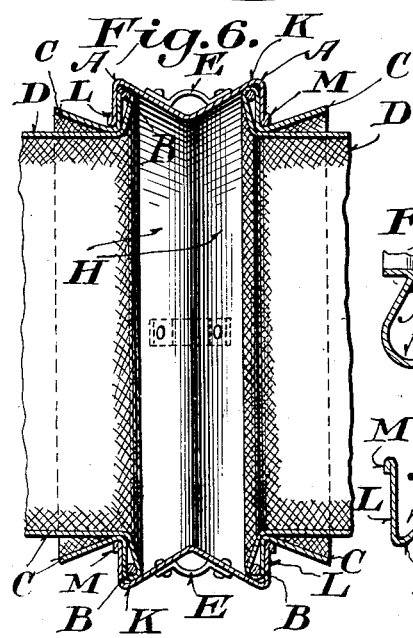

UNITED STATES PATENT OFFICE 2,003,732

COUPLING FOR CANVAS TUBING

Frank M. Bins, Butte, Mont.

Application January 30, 1935, Serial No. 4,180

3 Claims. (Cl. 285—71)

This invention relates to means for coupling together sections of flexible collapsible tubing usually made of canvas and commonly used for conducting air or gases from one point to another as in ventilation of mines; and one object of my invention is to provide inexpensive, durable, and effective means for readily coupling sections of or lengths of such canvas tubing together while permitting the sections to be readily disconnected when desired, the couplings being provided with means whereby the tubing can be readily suspended in operative position.

The present invention is an improvement upon the coupling disclosed in my U. S. Letters Patent No. 1,440,814 dated January 2, 1923. In said patent the coupling members were provided with interior annular grooves for receiving the split rings which were inserted in stitched hems at the ends of each tubing section, but said grooves were substantially circular in cross-section necessitating the use of rings necessarily of dimensions conforming with the radius of curvature of the annular grooves (allowing for the thickness of the canvas) in order to make an air-tight joint between the canvas and coupling. If the rings were not of the above mentioned proper diameter the tubing would not be held in proper contact with the walls of the grooves, and spaces or pockets would be left between the outer walls of the grooves and the tubing permitting leakage of air therepast. Moreover the rings, if not of the proper size, would slide laterally in the grooves thereby further enlarging the spaces or pockets between the outer groove walls and the tubing causing still greater leakage of air. Furthermore in my patented construction it was necessary to stitch the hems at the ends of the tube sections which received the split rings.

The principal object of my present invention is to provide annular coupling members substantially V-shaped in cross-section, i. e., having opposed conical surfaces at its center with the outer edges turned or rolled sharply upwardly and extending substantially normal to the longitudinal axis of the sections, whereby the interior grooves instead of being circular in section are acutely angular in cross-section so that split rings of various sizes may be used in the grooves, and the rings when expanding in the grooves will slide down the conical walls of the grooves to position the rings at all times at the apex of the grooves in which position the rings will hold the canvas securely against the outer walls of the grooves.

A further object is to provide a coupling so designed that the cuffs at the ends of the tubing which receive the split rings need not be stitched down, the tubing being frictionally held in engagement with the outer walls of the grooves due to the shape of the grooves, and the cuffs which are folded over the free ends of the outer walls of the grooves being further held frictionally gripped between the outer wall and the inflated body of the section of tubing opposite the outer wall.

A further object of this invention is to provide a coupling so designed that quick repairs can be made to damaged ventilation tubing without any stitching or sewing. Sometimes a falling rock underground may destroy part of a section of the ventilation tubing puncturing holes in the tubing sections. Also the concussion of a blast might rip part of a tubing section if the end of the tubing were disposed too near the blasting face. With my novel frictionally held tubing, coupling repairs can be speedily made in a mine or the like without the aid of a needle or sewing machine. All that is required to make such repair is to cut out the damaged section of tubing, and to take two of my novel couplings and set a new coupling section into the damaged line, without necessitating any sewing while making a perfectly airtight joint.

I will explain the invention with reference to the accompanying drawing which illustrates several preferred embodiments of the invention; and will refer to the claims for summaries of the essentials of the invention, the novel features of construction, and novel combinations of parts for which protection is desired.

In said drawing:—

Fig. 1 is a side elevation of a length of ventilating pipe formed of a plurality of sections of flexible tubing connected together by my novel couplings which are shown suspended from a cable. Fig. 2 is an enlarged side view of one of the annular couplings shown in Fig. 1. Figs. 3 and 4 are views showing different forms of contracted split rings used in connection with the couplings. Fig. 5 is a plan view of one of the rings in expanded position. Fig. 6 is a transverse sectional view through one complete coupling (on the lines 6—6, Fig. 1) showing the ends of two tubular sections connected therewith. Fig. 7 is a section through the coupling disclosed in my former patent showing the relation of the parts when a split ring of small diameter is used in connection therewith. Fig. 8 is a section through my preferred form of coupling showing the acutely angular grooves, and illustrating its adaptability of different sizes of rings. Fig. 9 is a section through a modified form of coupling.

The coupling shown in Figs. 1, 2, 6 and 8 comprises an annulus made of any suitable material, preferably of sheet metal rolled into desired cross-section with its ends overlapped and united in any suitable manner such as by solder or rivets. The annulus should be made of an interior diameter equal to or slightly greater than the exterior diameter of the sections of tubing D which are to be connected together. Each annulus is provided with interior parallel annular grooves A, A, adjacent its side edges for receiving split rings B, B, of metal each adapted to be inserted in loose cuffs C, C, at the ends of the sections of canvas tubing D, which cuffs are formed merely by folding back on the exterior surface of the body of the tubing a portion of its length, and the cuff being unsewn. The split rings B, B, are placed in the cuffs C, C, and the rings contracted and slipped into the opposite ends of the annular coupling and the rings then permitted to expand, thereby seating in the grooves A, A, and connecting the two sections of tubing D, D, to the coupling. The coupled sections may then be used in a vertical, horizontal or inclined position, and for this purpose the couplings are preferably provided with eyelets E or other means for engagement with hooks F or other suitable devices by which the coupled sections may be fastened or supported upon wires or cables G or the like.

The annular coupling (Figs. 1, 2, 6 and 8) has a central portion of substantially inverted V-shaped cross-section formed by a pair of opposed conical surfaces H, H, which the rings A, A (in the cuffs C, C) engage when expanding. Sharply rounded or bent portions K, K, are provided at the outer edges of the conical portions H, H, the outer side walls L—L of the grooves continuing substantially normal to the axis of the tubing D. By the above construction the annulus is provided with a pair of internal annular grooves in which the outer walls L—L are normal to the axis of the tubing D, and the conical inner walls H—H are disposed at an angle to the outer walls whereby the split rings A—A when expanding in the grooves will be forced laterally until they contact with the outer walls L—L. Thus regardless of the diameter of the rings the latter will constantly have points of contact with each wall of the groove as shown in Fig. 8. Preferably the outer end of the outer wall L—L is bent backwardly upon itself, as at M, to prevent cutting of the overlying portion of the cup C.

In my aforesaid patent the grooves A'—A' as shown in Fig. 7 were substantially circular in cross-section, permitting lateral movement of the rings B'—B', if of smaller diameter than the grooves, due to the fact that the bottom of the grooves A' were rounded, and it will be noted that a space or pocket $x$ (Fig. 7) would be left between the material of hem C' and the outer wall L' of the groove as the cuff could not be held by the ring snugly against the outer wall. Moreover if a longitudinal pull or strain were placed on the tubing the rings B'—B' (and the hem) would have a tendency to slide laterally towards the center of the coupling thereby increasing the size of the space or pocket $x$. Such lateral movement would cause leakage of air through the pockets $x$ due to the fact that the ring and hem of the tubing were not held with sufficient bearing surface against the outer wall L' of the groove. In my old form of coupling the tubing would be held fairly well after the tubing had been inflated, but the connection was found to leak before the air pressure became of sufficient force to push the cuff of the tubing firmly against the outside wall of the groove. Moreover if the pressure were reduced the joints would have a chance to become loose again as the circular grooves of my patented construction would permit lateral movement of the ring.

With my new form of coupling (shown in Fig. 8) having the conical inclined walls H—H sloping towards the outer walls L—L of the grooves the above objectional feature of air leakage in my patented coupling is entirely eliminated, due to the fact that the inclination of the inner walls H—H will cause the expanding rings B—B and the cuff C of the tubing which surrounds the rings to slide automatically into place against the outer wall L—L of the grooves which is the primary function of the inclined conical walls H—H, eliminating any possible lateral movement of the split rings regardless of the diameter of the rings. My new coupling having the inclined inner wall H extending to the outer wall L, will thus be applicable to any diameter of rings or any thickness of tubing material, and any danger of slippage of the tubing material or of the rings is entirely eliminated as the rings are always seated in acutely angular recesses of the annulus. In my old type of coupling it was practically impossible to prevent the leakage of air because the tubing only had two points of contact with the coupling material as shown in Fig. 7, whereas in the new type of coupling the contact of the tubing material with the coupling is continuous, from the outer end of wall L to the point of contact of ring B with inner wall H of the groove thus making a perfect air tight joint. All folds of the tubing are exterior, primarily because interior folds would retard the free flow of air thru the tube.

Furthermore in my aforesaid patent the hem in the tubing was turned inwardly and sewed or stitched as at D' to the body of the tubing D. In my present form of coupling however the cuff need not be sewed or stitched or secured in any manner to the body of the tubing, the cuffs for the rings B being formed merely by turning back a portion of the end of the tube so as to overlie the exterior of the tube (instead of the interior hem in my aforesaid patent), said cuff being of sufficient length to extend beyond the outer wall L of the groove. Referring to Fig. 3, the outer portion of the cuff C is shown as bent or folded at right angles over the outer end of wall L, and while the cuff is not stitched to the body of the tube the cuff is shown as frictionally gripped or clamped between the end of wall L and the inflated body of the tubing section and this frictional grip together with the ample bearing surface of the cuff down the full height of wall L to and under the point of contact of ring B with the inner wall H of the groove, is found sufficient to maintain the cuff intact without necessitating stitching.

If the stitching of the hem in my patented construction was omitted and a little deeper fold (exterior instead of interior) were used instead, the connection would still not be airtight as in my present coupling because of the lateral movement which is possible with all the formed patented shapes of annulus shown in my aforesaid patent, which movement of the rings and tubing formed the pockets $x$ (Fig. 7) and permitted leakage of air while the tube was being inflated.

I preferably form the ends of the split rings

B as illustrated in Figs. 3, 4, 5, the rings having overlapping ends which are wedge-shaped as shown so that the ends will not ride on top of one another as is sometimes the case in my old coupling which would prevent the canvas from being tightly held against the bottom of the coupling and would cause leakage of air. By making the abutting ends of the rings B, Fig. 4, beveled, when the expanded rings are contracted to uncouple the tubing the ends will not jam against each other, but will slide by each other, and will not ride upon each other as the ends do not overlap. This type of ring will at all times hold the tubing material snugly in the bottom of the groove A.

Fig. 9 shows a cross-sectional contour of a modified form of the annulus having a flattened portion between the opposed conical walls H—H. This modification is simply illustrative of the capacity of the invention for variation, and not as limiting it.

The solid corrugated or grooved annulus and the rings can be used repeatedly until physically destroyed; and the annulus is not covered or directly fastened to the canvas, thus leaving the suspending devices thereon always readily accessible, by which to hang or suspend said tubing.

To disconnect or uncouple a tubing section all that is required is to compress the split ring until the ring and tube end can be drawn out of the groove in the annulus.

With this type of coupling it is possible to make a repair in the tubing line with a length of tubing section many feet longer than the damaged section, because it is frictionally held and requires no sewing. With other couplings now on the market which necessitate the sewing of hems in the ends of the tubing material, the section to be replaced into a damaged line must be the exact length of the one to be replaced. With my novel coupling all that is required is to pull the cuff further through the coupling by lengthening the cuff. The tubing section would thus be shortened. By shortening the cuff the tubing section would be lengthened.

Another advantage of my coupling over the type that requires sewed or stitched hems in the tubing material, is that all odd lengths of tubing materials can be salvaged for making repairs in the tubing line. With the old type of coupling that requires a hem sewed into the tubing, to salvage a short length of tubing was too costly, because it was necessary to take the tubing section from the mine or other underground location to the surface of the ground and into a shop where a new coupling could be sewed into the end of the damaged section, and then it was necessary to transport the repaired section back into the mine; and even then it might be found that the section of tubing to be replaced would be somewhat too long or too short. With my new novel coupling the tubing section can be shortened at will if too long, this being done by lengthening the cuff, or the section can be lengthened by shortening the cuff, and either operation can be accomplished in a few minutes' time, underground where the repair is to be made.

I claim:—

1. A coupling, comprising an annular member formed of sheet metal and provided with interior circumferential parallel grooves of substantial V-shape cross-section; expansive spring rings having overlapping ends and of normally larger diameter than the internal diameter of the annulus; each ring being adapted to be engaged with a cuff formed at the end of a flexible tube section; the spring rings in the cuffs of adjacent tube sections being respectively wedged in the grooves in the annulus, whereby rings of various diameters will automatically contact with both walls of the grooves.

2. A coupling, comprising an annular member formed of sheet metal and provided with interior circumferential parallel grooves, the outer wall of each groove being disposed substantially normal to the axis of the annulus, and the inner wall of each groove being disposed at an acute angle to the outer wall, expansive spring rings having overlapping ends and of normally larger diameter than the internal diameter of the annulus; each ring being adapted to be engaged with a cuff formed at the end of a flexible tube section; the spring rings in the cuffs of adjacent tube sections being respectively wedged in the grooves in the annulus, whereby rings of various diameters will automatically contact with both walls of the grooves and thereby hold the cuffs securely against the outer walls of the grooves.

3. A coupling, comprising an annular member formed of sheet metal and provided with interior circumferential parallel grooves, the outer wall of each groove being disposed substantially normal to the axis of the annulus, and the inner wall of each groove being disposed at an acute angle to the outer wall, expansive spring rings having overlapping ends and of normally larger diameter than the internal diameter of the annulus; each ring being adapted to be engaged with an exterior cuff at the end of a flexible tube section; the spring rings in the cuffs of adjacent tube sections being respectively wedged in the grooves in the annulus, the cuffs being folded over the outer ends of the outer walls and frictionally gripped between the wall and the body of the tubing section.

FRANK M. BINS.